US010802505B2

United States Patent
Dold

(10) Patent No.: US 10,802,505 B2
(45) Date of Patent: Oct. 13, 2020

(54) DRIVERLESS TRANSPORT SYSTEM

(71) Applicant: SICK AG, Waldkirch/Breisgau (DE)

(72) Inventor: Franz Dold, Furtwangen (DE)

(73) Assignee: SICK AG, Waldkirch/Breisgau (DE)

(*) Notice: Subject to any disclaimer, the term of this patent is extended or adjusted under 35 U.S.C. 154(b) by 264 days.

(21) Appl. No.: 15/911,587

(22) Filed: Mar. 5, 2018

(65) Prior Publication Data
US 2018/0259975 A1 Sep. 13, 2018

(30) Foreign Application Priority Data

Mar. 8, 2017 (EP) .................................. 17159855

(51) Int. Cl.
G05D 1/02 (2020.01)
H04W 4/44 (2018.01)
H04W 4/80 (2018.01)
G08G 1/16 (2006.01)

(52) U.S. Cl.
CPC .......... G05D 1/0289 (2013.01); G05D 1/0297 (2013.01); G08G 1/164 (2013.01); H04W 4/44 (2018.02); H04W 4/80 (2018.02)

(58) Field of Classification Search
CPC ..... G05D 1/0289; G05D 1/0297; H04W 4/44; H04W 4/80; G08G 1/164
USPC .......................................................... 701/23
See application file for complete search history.

(56) References Cited

U.S. PATENT DOCUMENTS

| 6,049,745 A | 4/2000 | Douglas et al. |
| 2007/0152845 A1 | 7/2007 | Porte et al. |
| 2009/0012882 A1* | 1/2009 | Sarangapani .......... G01C 21/32 705/28 |
| 2014/0375431 A1 | 12/2014 | Cristache |

OTHER PUBLICATIONS

European Search Report dated Jul. 20, 2017 corresponding to application No. 17159855.0-1802.

* cited by examiner

Primary Examiner — Paula L Schneider
(74) Attorney, Agent, or Firm — Nath, Goldberg & Meyer; Jerald L. Meyer

(57) ABSTRACT

The present invention relates to a driverless transport system for transporting goods and/or persons that comprises a plurality of driverless vehicles and at least one stationary monitoring device for monitoring a respective travel path zone, wherein the monitoring device comprises at least one sensor that is configured to detect the presence of objects in the travel path zone and to output a detection signal when an object is located in the travel path zone and a control unit that is connected to the sensor and that is configured to receive the detection signal from the sensor and to generate a control signal for the at least one driverless vehicle based at least on the detection signal.

9 Claims, 1 Drawing Sheet

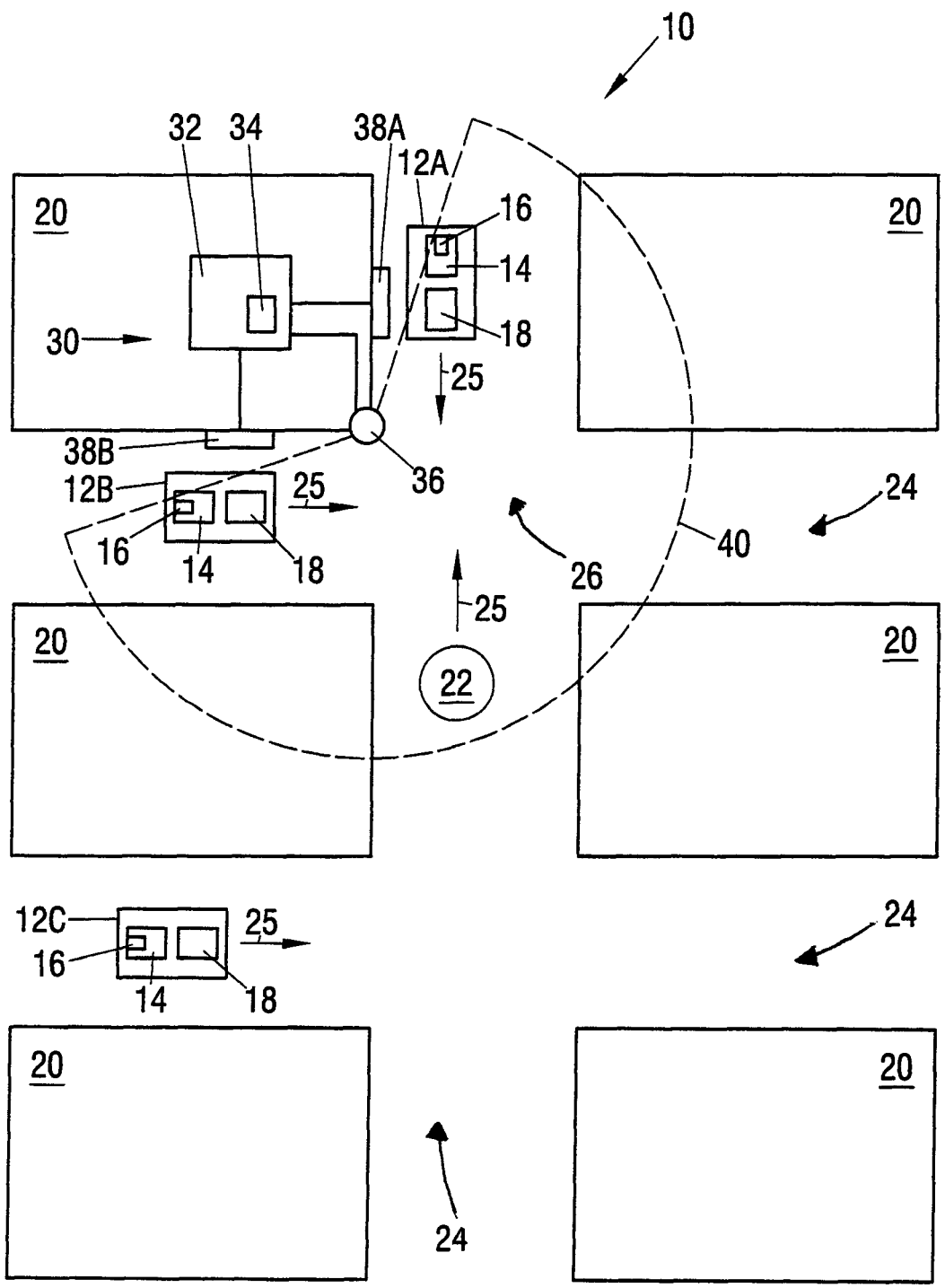

DRIVERLESS TRANSPORT SYSTEM

FIELD

The present invention relates to a driverless transport system for transporting goods and/or persons that comprises a plurality of driverless vehicles and at least one stationary monitoring device for monitoring a respective travel zone, wherein the monitoring device comprises at least one sensor that is configured to detect the presence of objects in the travel path zone and to output a detection signal when an object is located in the travel path zone and a control unit that is connected to the sensor and that is configured to receive the detection signal from the sensor and to generate a control signal for at least one of the driverless vehicles based at least on the detection signal.

BACKGROUND

Driverless transport systems are used, for example, in industrial environments such as production floors, storage buildings, storage areas and/or other environments as well as also outside of buildings to transport goods within this environment. A use of driverless transport systems for transporting persons in public and/or non-public transport networks is also increasingly becoming of interest.

A navigation of the driverless vehicles can take place in a manner known per se with the aid of control systems that are, for example, present in the vehicle and/or that can communicate with the vehicle over a suitable communication link, with such a control system, on the one hand, being able to be connected to one or more sensors for the position determination of the vehicle and, on the other hand, being able to communicate with corresponding drive and steering systems of the vehicle to navigate the vehicle through the environment.

The vehicles can be equipped with suitable monitoring sensors for avoiding collisions with persons, stationary obstacles, or other vehicles. However, such vehicle-accompanying monitoring sensors are not sufficient in all situations since all the travel path zones cannot always be seen by the accompanying sensors. There is in particular the risk at intersections in whose region buildings or vision-obstructing obstacles are present that vehicles or persons that cross the provided travel path are not detected or are not detected in time.

To reduce such risks, the vehicles have to be controlled with a large distance from obstacles that could restrict the angle of view of the monitoring sensors and/or have to be moved at a correspondingly lower vehicle speed so that the driverless vehicle can be braked in time to avoid a collision on a sudden appearance of obstacles.

The performance of the transport system is hereby limited, however.

A first improvement can be achieved in that confusing travel path zones are monitored by stationary monitoring devices, for example laser scanners. The stationary monitoring devices can, for example, be arranged at building corners or obstacle corners so that the arising of blind spots is largely avoided.

If such a stationary monitoring device detects an object, for example a person or another vehicle, in the monitored travel path zone, a control signal can be transmitted to the driverless vehicle that influences the control system of the vehicle such that a collision is avoided.

When the stationary monitoring device detects an object in the travel path zone, it is, however, often difficult or impossible to distinguish whether the object is a person or a vehicle. If there is namely a potential risk of a human-vehicle collision, the vehicle may not drive into the travel path zone as long as the endangered person is not recognizable by the monitoring sensor of the vehicle. If, however, the detected object is a further vehicle and there is only the risk of a vehicle-vehicle collision, the vehicle may drive into the travel path zone when it is ensured that the other vehicle is stationary.

A method and a system for navigating autonomously driving vehicles is described in U.S. Pat. No. 6,049,745 A in which the navigation takes place with the aid of a plurality of RFID tags arranged along a travel path of the vehicles.

SUMMARY

It is the object of the present invention to provide a driverless transport system of the initially named kind that ensures an improved distinction and/or identification of detected objects.

The object is satisfied by a driverless transport system having the features of claim 1.

Provision is made that at least one of the driverless vehicles comprises an RFID transponder that is configured to transmit a transponder signal that comprises at least one vehicle-specific identifier and that the monitoring device furthermore comprises at least one RFID reading device that is connected to the control unit and that is configured to receive a transponder signal transmitted by the RFID transponder, wherein the control unit is configured to furthermore generate the control signal on the basis of the received transponder signal.

The control unit is adapted to link a detection signal generated by the sensor, by a laser scanner, for example, to a received transponder signal. If, for instance, a transponder signal is simultaneously received from a detected object, the monitoring device assumes that the detected object is a vehicle. If a corresponding transponder signal is, however, not received or if the zone from which the transponder signal was received does not coincide with the zone in which the sensor has detected the object, it is assumed that the object detected by the sensor has to be a person. The monitoring device or its control unit can transmit restrictive or permissive control commands on the basis of this identification or distinction, for example commands to stop or to evade, travel releases, steering commands and/or speed restrictions.

Said travel path zones can, for example, be intersections or junctions of travel paths or travel roads and/or holding zones such as loading stations or parking bays. The vehicle path zone to be monitored cannot only comprise a direct danger zone, for instance the actual intersection area, but can also include one or more approach zones that are e.g. difficult to see or to be monitored from a driverless vehicle and/or that are required as stopping or braking distances for the vehicles to prevent collisions.

Optoelectronic sensors such as laser scanners, light barriers, light grids or the like or radar sensors can, for example, be used as sensors of the stationary monitoring device. The sensors can be connected to the control unit in a wireless or wired manner.

With a driverless transport system in accordance with the invention, a plurality of driverless vehicles are provided that respond to control signals of the stationary monitoring device. As a rule, all of these vehicles are equipped with an RFID transponder, with it also being conceivable, however, that individual vehicles do not have an RFID transponder.

It is possible due to the vehicle-specific identifier to identify an object detected by the sensor as a specific vehicle and to generate specific control signals for this vehicle intended for this vehicle and to transmit them to this vehicle.

In comparison with other conceivable solutions, there is a further advantage of the use of RFID transponders in small power consumptions for the communication with the monitoring device, which relieves the battery of driverless vehicles.

Advantageously, a plurality of RFID reading devices are associated with a travel path zone monitored by a respective monitoring device so that the spatial resolution is further improved on the reception of transponder signals. This can in particular be useful if a plurality of objects are simultaneously located in a specific travel path zone.

In accordance with an advantageous embodiment, the transmission range between the RFID transponder of a respective vehicle and the at least one RFID reading device connected to the control unit is limited such that transponder signals are only received from vehicles that are located within the monitored travel path zone or within a part zone thereof. An incorrect association and/or an incorrect identification is thereby avoided of vehicles that are a long way away from the stationary monitoring device.

In accordance with a further advantageous embodiment, the sensor is furthermore configured to determine a first piece of position information on a detected object and to transmit the first piece of position information to the control unit, wherein the control unit is configured to furthermore generate the control signal on the basis of the first piece of position information. The sensor is advantageously configured as a laser scanner, in particular as a distance measuring laser scanner, for this purpose. The first piece of position information can, for example, be a distance and/or an angular position of the object with respect to the sensor or also an absolution position with respect to the vehicle path zone. The accuracy in the identification of detected objects is hereby further improved.

In accordance with a further advantageous embodiment, the control unit is configured to determine a second piece of position information on the vehicle whose associated RFID transponder has transmitted this transponder signal on the basis of a respective received transponder signal, wherein the control unit is configured to furthermore generate the control signal on the basis of the second piece of position information. The second piece of position information can, for example, be acquired on a use of a plurality of RFID reading devices by a comparison of the received transponder signals. From which of the associated RFID reading devices a specific transponder signal was received can thus be evaluated, for instance. A consideration of the signal strengths can be provided; for example, a comparison of the signal strengths with a plurality of RFID reading devices or an absolute value with only a single reading device.

In accordance with an advantageous further development of the two above-named embodiments, the control unit can be configured to link the first and second pieces of position information to one another to determine further information on a detected object. The accuracy in the categorization or identification and/or in the position determination of a detected object can thereby be further improved.

In accordance with a further advantageous embodiment, the monitoring device has at least one communication apparatus that is configured to transmit signals wirelessly to the driverless vehicles.

In accordance with a further development of this embodiment, said communication apparatus is configured for wireless communication in a local radio network. Such a local radio network is also called a wireless LAN. The range of the communication apparatus can be greater here than the range between the RFID reading device or devices and an RFID transponder of a respective vehicle. The wireless communication advantageously takes place at least unidirectionally in the direction from the monitoring unit to the vehicles, with a bidirectional communication being preferred.

In accordance with a particularly preferred embodiment of the above-named embodiment and of the above-named further development, said communication apparatus comprises an RFID transponder. In this case, the monitoring device therefore likewise has at least one RFID transponder that is advantageously connected to the control unit and transmits transponder signals that can be received by a corresponding RFID reading device of a driverless vehicle. The monitoring device can in particular also have two communication apparatus, i.e. for example a wireless LAN communication apparatus and an RFID transponder. The control unit can transmit messages to the connected RFID transponder on the basis of which the transponder signals are generated. The transmission of control signals via RFID transponders in the monitoring device to the reading device of a driverless vehicle is in particular favorable since it is often sufficient to transmit very brief messages. Control signals can thus, for example, be transmitted as simple numerical codes (1, 2, 3, . . . ) that are then converted into control signals (stop, drive more slowly, . . . ) in the reading device of the driverless vehicle, for example, with the aid of a look-up table.

In accordance with a further advantageous embodiment of the invention, the signals transmitted by the communication apparatus comprise an identifier identifying the monitoring device and/or the control signal. The following options in particular result for the transmission of signals by the communication apparatus connected to the monitoring device:

The communication device transmits signals, in particular control signals, to the vehicles exclusively via the local radio network (wireless LAN). No identifier is transmitted;

Furthermore, as mentioned above, signals, in particular control signals, can be transmitted to the vehicles via the local radio network (wireless LAN), with an identifier of the monitoring device additionally being transmitted to a corresponding RFID reading device of the vehicle via an RFID transponder of the monitoring device;

Furthermore, signals, in particular control signals, for the vehicles and an identifier of the monitoring device can also both be determined at the vehicles via the RFID transponder of the monitoring device. In this case, a code transmitted from the RFID transponder by means of the transponder signals can be variable, i.e. the code can comprise different telegrams or messages;

In general, however, signals, in particular control signals, for the vehicles and an identifier of the monitoring device can both be transmitted via the local radio network (wireless LAN).

Further advantageous embodiments of the invention result from the dependent claims, from the description and from the drawings.

BRIEF DESCRIPTION OF THE DRAWINGS

The invention will be described in the following with reference to an embodiment and to the FIGURE.

FIG. 1 schematically shows a scene in which a driverless transport system in accordance with an embodiment of the invention is operated.

DETAILED DESCRIPTION

An environment or scene 10 in which a driverless transport system in accordance with an embodiment of the present invention is operated comprises a plurality of obstacles 20, for example machines, storage containers, buildings or building parts, between which a plurality of crossing vehicles 24 pass.

The driverless transport system comprises a plurality of driverless vehicles 12A to 12C that each comprise a control system or a vehicle control 14 for controlling the respective vehicle 12A to 12C through the scene. The vehicles 12A to 12C can furthermore have at least one respective monitoring sensor (not shown) connected to the vehicle control 14 for monitoring a vehicle environment.

The vehicle control 14 is connected to a communication device 16 that is at least adapted to receive wirelessly transmitted signals, in particular control signals. The vehicles 12A to 12C furthermore have a respective RFID transponder 18 that transmits a transponder signal by an RFID reading device on demand in a manner known per se, said transponder signal comprising at least one vehicle-specific identifier.

The vehicles 12A to 12C move on the travel paths 24 in respective travel directions indicated by arrows 25 in FIG. 1.

A stationary monitoring device 30 that comprises a central control unit 32 is provided at one of the obstacles 20. The control unit 32 is connected to a communication apparatus 34 that is configured at least to transmit signals, in particular control signals, wirelessly to one or more of the vehicles 12A to 12C. The communication apparatus 34 is advantageously also configured to receive signals that are transmitted by a communication device 16 of a respective vehicle 12A to 12C. The communication apparatus 34 and the communication devices 16 are preferably configured for wireless communication in a local radio network, for example in accordance with a standard of the standard family IEEE-802.11 (wireless LAN). The communication apparatus 34 can be integrated in the control unit 32.

The monitoring device 30 is connected to a sensor 36 that is configured to detect the presence of objects in a vehicle path zone 26. The sensor 36 can, for example, be an optical sensor, in particular a laser scanner, and is preferably configured for a spatially resolved detection of objects. A detection zone 40 of the sensor 36 is indicated by a dashed line.

It is possible due to the monitoring device 30 also to monitor those zones of the travel paths 24 that are not visible or are only visible at a very late point in time by monitoring sensors arranged at the vehicles 12A to 12C. The vehicles 12A and 12B can thus, for example, not "see" directly in the situation shown in FIG. 1, but are both detected by the sensor 36.

The control unit 32 is furthermore connected to two RFID reading devices 38A, 38B that are arranged at different sides of the obstacle 20 having the monitoring device 30 in the region of the respective travel paths 24. The RFID reading devices 38A, 38B can as a rule transmit requests for the transmission of transponder signals.

An example operating scenario will be described in the following. The vehicles 12A and 12B as well as a person 22 approach the vehicle path zone 26 monitored by the monitoring device 30 in directions indicated by arrows. As soon as they enter into the detection zone 40, they are detected as respective objects by the sensor 36. The sensor 36 or the control unit 32 connected thereto are, however, not able to distinguish whether the detected objects are vehicles or persons solely on the basis of the detection signals generated by the sensor 36.

However, as soon as vehicles come into proximity with the RFID reading devices 38A, 38B, the RFID reading devices 38A, 38B can receive respective transponder signals from the RFID transponders 18 of the vehicles 12A, 12B, with the transponder signals comprising respective vehicle-specific identifiers that enable an identification of the individual vehicles 12A to 12C. Since the position of the RFID reading devices 38A, 38B is known within the scene 10, the control unit 32 can associate the corresponding identifiers transmitted by the respective RFID transponders 18 with the received signals of the sensor 36 going back to the vehicles 12A, 12B.

However, it is not possible to associate an identifier for the detection signal of the sensor 36 going back to the person 22 so that the control unit 32 has to assume on the basis of this missing identifier that the object 22 may be a person, even if only a vehicle external to the system or another non-human obstacle were present at this position that does not transmit transponder signals.

Since a collision with such a non-identifiable object has to be prevented at all costs for safety reasons, the control unit 32 transmits control signals via the communication apparatus 34 to the vehicles 12A, 12B that comprise a command to stop immediately. These control commands can comprise the specific identifiers of the vehicles 12A, 12B so that the vehicle controls 14 only respond to these control signals when a respective identifier transmitted by the control signals corresponds to the identifier of the vehicle associated with the receiving vehicle control 14.

The vehicle 12C can thus admittedly also receive a control signal with the command to stop. Since, however, the identifier of the vehicle 12C is not included in this control signal, the vehicle control 14 will not respond to this control signal. The vehicle 12C is not in the monitored vehicle path zone and also does not approach it. The vehicle 12C can thus continue its path without influence.

If the sensor 36 determines that the person 22 is no longer in the vehicle path zone 26, it can subsequently transmit corresponding control commands to the vehicles 12A, 12B that give it permission to continue its trip. To avoid a collision between the vehicles 12A, 12B, the control unit 32 can determine an order in which the vehicles 12A, 12B can continue their trips.

In accordance with a modification, the communication apparatus 34 can likewise be configured as an RFID transponder. The communication devices 16 of the vehicles 12A to 12C are accordingly formed as RFID reading devices in this case. There is accordingly a bidirectional RFID link between the vehicles 12A to 12C and the monitoring device 30 so that signals, in particular control signals, and/or identifiers can be exchanged in both directions.

In accordance with a further modification, the vehicle control 14 and the RFID transponder 18 of a respective vehicle 12A to 12C can be connected to one another. The RFID transponders 18 can thereby not only transmit fixedly programmed identifiers, but also additional information or data transmitted to them by the vehicle control 14.

REFERENCE NUMERAL LIST 10 scene
12A-12C vehicle
14 vehicle control
16 communication device
18 RFID transponder
20 obstacle
22 person 24 travel path
25 direction of movement
26 travel path zone
30 monitoring device
32 control unit
34 communication apparatus
36 sensor
38A, 38B RFID reading device
40 detection zone

The invention claimed is:

1. A driverless transport system for transporting goods and/or persons, the driverless transport system comprising:
a plurality of driverless vehicles;
at least one stationary monitoring device for monitoring a respective travel path zone, wherein the at least one stationary monitoring device comprises at least one sensor that is configured to detect the presence of objects in the travel path zone and to output a detection signal when an object is located in the travel path zone; and
a control unit that is connected to the at least one sensor and that is configured to receive the detection signal from said at least one sensor and to generate a control signal for at least one of the driverless vehicles based at least on the detection signal,
wherein at least one of the driverless vehicles comprises an RFID transponder that is configured to transmit a transponder signal that comprises at least one vehicle-specific identifier;
wherein the at least one stationary monitoring device furthermore comprises at least one RFID reading device that is connected to the control unit and that is configured to receive a transponder signal transmitted by the RFID transponder, and
wherein the control unit is configured to furthermore generate the control signal on the basis of the received transponder signal, and the monitoring device responding to the presence of a detection signal of the sensor with a determination that the detected object is a vehicle if a transponder signal of the detected object is simultaneously received, and the monitoring device responding to the presence of a detection signal of the sensor with a determination that the detected object is a person if a transponder signal is not simultaneously received or the transponder signal is received from a zone which does not coincide with the zone in which the sensor detected the object.

2. The transport system in accordance with claim 1, wherein the transmission range between the RFID transponder of a respective vehicle and the RFID reading device connected to the control unit is limited such that transponder signals are only received from vehicles that are located within the monitored travel path.

3. The transport system in accordance with claim 1, wherein the at least one sensor is furthermore configured to determine a first piece of position information on a detected object and to transmit the first piece of position information to the control unit, with the control unit being configured to furthermore generate the control signal on the basis of the first piece of position information.

4. A transport system in accordance with claim 3, wherein the control unit is configured to determine a second piece of position information on the vehicle whose associated RFID transponder has transmitted this transponder signal on the basis of a respective received transponder signal, with the control unit being configured to furthermore generate the control signal on the basis of the second piece of position information, and
wherein the control unit is configured to link the first and second pieces of position information with one another to determine further information on a detected object.

5. The transport system in accordance with claim 1, wherein the control unit is configured to determine a second piece of position information on the vehicle whose associated RFID transponder has transmitted this transponder signal on the basis of a respective received transponder signal, with the control unit being configured to furthermore generate the control signal on the basis of the second piece of position information.

6. The transport system in accordance with claim 1, wherein the at least one stationary monitoring device has at least one communication apparatus that is configured to transmit signals wirelessly to the driverless vehicles.

7. The transport system in accordance with claim 6, wherein at least one of the at least one communication apparatus is configured for wireless communication in a local radio network.

8. The transport system in accordance with claim 6, wherein at least one of the at least one communication apparatus comprises an RFID transponder.

9. The transport system in accordance with claim 6, wherein the signals transmitted by the at least one communication apparatus comprise at least one of an identifier identifying the monitoring device and the control signal.

* * * * *